United States Patent
Taylor

[15] 3,699,781
[45] Oct. 24, 1972

[54] REFRIGERANT RECOVERY SYSTEM

[72] Inventor: Larry Christopher Taylor, Philadelphia, Pa.

[73] Assignee: Pennwalt Corporation, Philadelphia, Pa.

[22] Filed: Aug. 27, 1971

[21] Appl. No.: 175,601

[52] U.S. Cl. ..................62/474, 62/85, 62/195, 62/298
[51] Int. Cl. ...............................F25b 43/04
[58] Field of Search....62/77, 85, 195, 292, 298, 474, 62/475

[56] References Cited

UNITED STATES PATENTS

| 2,341,430 | 2/1944 | Elsey | 62/77 |
|---|---|---|---|
| 2,400,620 | 5/1946 | Zwickl | 62/195 |
| 2,551,666 | 5/1951 | Gilmore | 62/85 |
| 2,705,405 | 4/1955 | Uhlman | 62/474 |
| 2,955,673 | 10/1960 | Kennedy | 62/85 |
| 2,986,905 | 6/1961 | Kocher | 62/475 |
| 3,131,548 | 5/1964 | Chubb | 62/475 |
| 3,478,529 | 11/1969 | Boykin | 62/475 |

Primary Examiner—William J. Wye
Attorney—Stanley Bilker

[57] ABSTRACT

Apparatus for recovery of halogenated hydrocarbon refrigerant from defective refrigeration and air conditioning systems removes entrained moisture, chlorides, oils and sludge so that the reclaimed refrigerant is restored to original specification purity standards.

9 Claims, 1 Drawing Figure

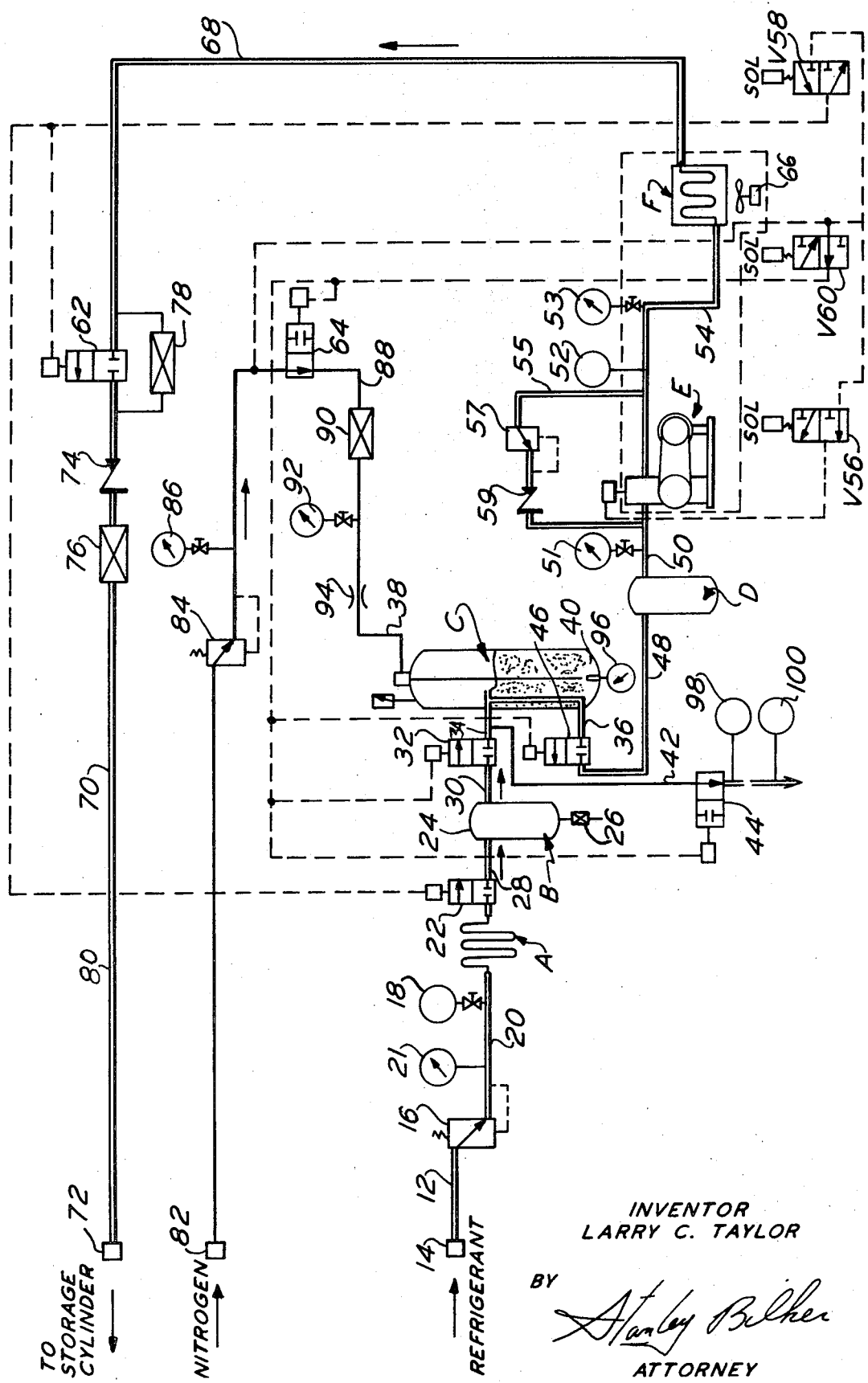

REFRIGERANT RECOVERY SYSTEM

This invention relates to an apparatus for recovery of refrigerant, especially halogenated hydrocarbons, from refrigeration and air conditioning systems in order that the reclaimed refrigerant will conform to prescribed standards of purity. More particularly, the invention relates to an integrated processing unit which is adapted to be coupled to the line of a defective refrigeration and/or air conditioning system, such as an automobile air conditioner, for withdrawal of the refrigerant of the refrigerant to remove entrained moisture, chlorides, oils and sludge whereby after treatment the recovered refrigerant is restored to specifications.

It has been found that moisture, oils and other contaminants tend to seep into the lines of all refrigeration systems, even though they are closed, and react chemically with the refrigerant itself to form acids and other byproducts which corrode the internal parts of the system and further break down the oil itself. Air, head and the acids operate on the oil causing it to decompose into resinous materials, waxes and sludge, which results in clogging of valves and motor burn-out. It is therefore advisable to periodically recover and restore the refrigerant in the system not only as a matter of preventative maintenance but also to treat and reclaim refrigerant from a defective system as well. That is, halocarbon refrigerants, such as dichlorodifluoromethane (refrigerant 12) or monochlorodifluoromethane (refrigerant 22), are sufficiently expensive as to warrant reclamation by recovery treatment procedures provided restoration to original standards of purity can be accomplished economically.

It is therefore an object of this invention to provide an apparatus for reclaiming of contaminated refrigerant from refrigeration, freezers and air conditioning systems and restoring the spent refrigerant to original standards of purity.

Another object of this invention is to provide a compact integrated refrigerant recovery apparatus which may be conveniently coupled to a refrigeration and/or air conditioning system for treatment and reclamation of the halogenated hydrocarbon refrigerant thereof.

Another object of this invention is to provide a refrigerant recovery system in which any possibility of contaminated refrigerant polluting the atmosphere is eliminated.

Other objects of this invention are to provide an improved means of the character described that is easily and economically produced, which is sturdy in construction and both highly efficient and effective in operation.

With the above and related objects in view, this invention consists of the details of construction and combination of parts as will be more fully understood from the following detailed description when read in conjunction with the accompanying drawing in which:

The FIGURE is a schematic diagrammatic view of a refrigerant recovery system embodying this invention.

Referring now in greater detail to the drawing in which similar reference characters refer to similar parts, the refrigerant recovery apparatus of this invention includes a heater A for vaporizing any liquid which may have formed in the refrigeration manifold, a strainer and oil separator, generally designated as B, a drier, generally designated as C, an after filter, generally designated as D, and a compressor E which then pumps the refrigerant through an after-cooler F for reliquefaction and return to a storage cylinder (not shown).

The refrigerant to be reclaimed from the defective system is directed into inlet line 12 by way of quick-disconnect fitting 14, which includes an internal check valve and passes through pressure regulating valve 16 to heater A. Pressure regulating valve 16 also acts at higher pressures to cool the gas thereby permitting condensation in the heating coil manifold to prevent carryover of any liquid into the drier. Pressure switch 21 is a low level pressure control set at 11 psig and is adapted to throw the compressor E into unload position when the pressure falls below such pressure. If the pressure in line 20 should fall below the predetermined pressure of 11 psig which has been set, the system inlet and outlet valve will also be automatically thrown into closed position. Pressure gauge 18 provides a visual indication of the inlet pressure. Although one minimum pressure of 11 psig has been found practical, the minimum pressure setting for the system can range from 1 psig to 15 psig, for example.

The heater A constitutes a warm-up coil in which several turns of uninsulated copper tubing permit the gas in line 20 to be heated by ambient air. The warm-up coil or heater A vaporizes any liquid which may have formed in the manifold. Air-operated inlet system valve 22 acts to close off refrigerant flow into the system. The refrigerants will be introduced into the recovery system inlet normally at atmospheric temperatures but may be as low as 2°F. for refrigerant 12 and −20°F. for refrigerant 22, refrigerant 12 ($CCl_2F_2$) having a boiling point of −21.6°F. at atmospheric pressure while refrigerant 22 ($CHClF_2$) boils at −41.4°F.

The strainer and oil separator B comprises an oil and water droplet removal cartridge type filter such as a model MCC 1001 VU160 reverse type 1 micron SU filter manufactured by Pall Trinity Micro Corporation, of Cortland, New York, and described in its Bulletin E25B. The cartridge filter medium (not shown) consists of epoxy impregnated cellulose base material over which has been applied multiple layers of extremely fine inorganic fibrous materials integrally bonded together by means of an epoxy impregnant. The strainer/oil separator B also includes a steel housing 24 having a block valve 26 to permit draining. Submicron particulate matter is retained on the strainer element, and all liquids are coalesced and collected in the housing. This liquid may be periodically drained through valve 26. The flow of refrigerant proceeds from line 28 into the separator B and exits through line 30 where it encounters air-actuated valve 32 to the inlet of dryer C. The separator removes 99 percent of all incident liquid oil and 98 percent of solid contaminants larger than 0.04 microns preparatory to delivery of the refrigerant to the dryer C.

The dryer C comprises a heat reactivated molecular sieve desiccant drying apparatus in which the desiccant is supported within a bed. The bed is also in contact with a plurality of outwardly extending heat conducting fins. Dryer inlet line 34 carries the refrigerant gas into dryer C where it passes through the desiccant bed, activated alumina for example, for moisture and chloride removal with the dried refrigerant exiting through line 36. The dryer C requires regeneration when test of the effluent (liquid) refrigerant has a water level in excess of 10 PPM. A counter-current preheated dry gas purge (nitrogen) from line 38 enters the plenum area of the chamber 40 whereupon it is dispersed through the wet desiccant bed and exits to atmosphere via line 42 and purge discharge valve 44. Internal finned heaters (not shown) effectively conduct regeneration heat throughout the entire desiccant bed. Gas actuated valve 46 at the dryer exit passes the refrigerant being treated from line 36 along through line 48 to the inlet of after filter D.

The after filter D also constitutes a cartridge filter apparatus, such as high grade activated carbon system combined with a 3 micron filter element, all mounted within a stainless steel housing. The cartridge (not shown) is a high area corrugated cylinder fabricated of epoxy resin impregnated cellulose fiber and an annular bed of activate carbon adsorbent contained between an outer perforate cylinder and the corrugated cylinder, for example a model MCS 1001 CE 16 filter, made by Pall Trinity Micro Corporation. The after filter D is located downstream of the dryer C to provide further assurance of complete removal of all particulate matter in the submicron range. The processed refrigerant is then passed through line 50 to the compressor E and condenser F where the vapors are liquefied. A pressure gauge 51 in line 50 provides a visual indication of the pressure in the intake side of the pressure while pressure gauge 53 indicates the discharge pressure.

The compressor E is a gas-phase, two-stage, dry wall piston compressor, such as a model D190 made by Corken Pump Company, of Oklahoma City, Oklahoma. The dry-wall compressor is designed and built to compress the refrigerant gas without lubrication of the cylinders. The compressed gas does not enter the crankcase, but the crankcase is at atmospheric pressure and is lubricated with an automotive type pressurized oil system. Hence, the "dry-wall" construction does not "use" oil. A finned heat exchanger (not shown) between the high and low stages of the compressor acts as an intercooler to dissipate the heat of compression of the first stage cylinder before the gas enters the second stage cylinder. The compressor E also includes a pressure unloading system to permit idle or by-pass of the gas being pumped when the pressure falls below or exceeds a predetermined level. High level pressure switch 52 in the discharge line 54 from the compressor serves to deactuate solenoid valves V56 and V58 when the pressure in line 54 exceeds a predetermined level set at 300 psig., the valves V56 and V58 also being deactivated when the pressure in inlet line 20 falls below the level of 11 psig set on low level pressure switch 18. In this regard, solenoid valves V56 and V58 are shown in deenergized disposition in the drawing while solenoid valve V60 is shown in energized position. Solenoid valve V56 operates the compressor unloader; solenoid valve V58 actuates refrigerant discharge valve 62 as well as system inlet valve 22 to close both; and solenoid valve V60 operates nitrogen gas purge inlet valve 64, purge outlet valve 44 as well as dryer inlet valve 32 and dryer outlet valve 46. Thus, when the recovery system reaches either set point, 11 psig inlet or 300 psig outlet as registered respectively on indicators 18 and 52, the system inlet valve 22 and system outlet valve 62 is caused to close. Should either condition occur, it normally indicates that the refrigerant system being drained is empty or the storage cylinder (not shown) at the discharge is full. If the supply is depleted prior to filling of the storage container, the compressor E automatically unloads and reloads automatically when the supply is adequate. A by-pass line 55 in parallel with the compressor E includes a 10 psig pressure relief valve 57 and a check valve 59 which prevent overpressurizing the intake as might cause backflow while at the same time allow for refrigerant feedback during unloading. The by-pass line also prevents a suction condition on the filters and driers upstream of the compressor.

The after cooler F constitutes a finned air cooled condenser 64 which is cooled by a fan 66 such that the vapors compressed by the compressor unit E become liquefied. The liquefied reclaimed refrigerant is then delivered through line 68 and discharge valve 62 to outlet line 70. Outlet line 70 is coupled to a storage cylinder (not shown) by way of a quick disconnect valve 72. Included in the refrigerant discharge line 70 is a check valve 74, a manually operated blocking valve 76 and a manually operated valve 78 by-passing automatically actuated discharge valve 62. When the storage cylinder being loaded is full, a weight switch (also not shown) may be deenergized to close inlet and outlet valves 62 and 22 and stop the compressor E.

When the desiccant dryer C requires regeneration, it is accomplished by purging heated nitrogen gas through the dryer while refrigerant lines in the recovery system are closed. A nitrogen supply cylinder (not shown) is coupled to line 80 by way of quick disconnect coupling 82. Pressure regulating valve 84 and pressure gauge 86 are included in line 82 whereby the purge pressure may be adjusted to 95 psig. On the distal side 88 of gas actuated purge inlet valve 64 is a manual block valve 90, a pressure gauge 92, which acts as a purge flow indicator, and a purge flow orifice 94. A temperature controller and indicator 96 is incorporated within the dryer C, and governs proper bed temperature. Thermo switches 98 and 100 on the atmosphere side of purge outlet valve 44 control the duration of the regeneration cycle. During the regeneration period, a thermo switch (not shown) associated with the controller 96 automatically de-energizes the heating elements when the chamber temperature reaches 450° F. to prevent heater burnout, which might otherwise occur if flow of purging nitrogen is cut off. When a temperature of 300° F. is sensed by thermo switch 98, the heater is similarly de-energized to indicate that heating is completed. The purge gas continues to flow through the dryer chamber and cools the desiccant. When the temperature reaches 140° F., the switch 100 becomes actuated to signify that the regeneration cycle is complete, whereupon automatic closure of purge valves 44 and 64 is effected.

As is apparent from the foregoing description, an extremely compact and efficient refrigerant recovery system is provided by the instant invention, whereby efficient reclaiming and purification of refrigerant 12 and/or 22 may be effected. The system removes entrained moisture, chlorides, oils and sludges and then compresses the purified vapor phase for liquefaction in a storage cylinder.

Although this invention has been described in considerable detail, such description is intended as being illustrative rather than limiting, since the invention may be variously embodied without departing from its spirit, and the scope of the invention is to be determined as claimed.

What is claimed is:

1. Apparatus for recovering halogenated hydrocarbon refrigerant from defective air conditioning and refrigeration systems comprising
   means for connecting the apparatus to the refrigerant system,
   means for heating the refrigerant to effect expansion thereof from a liquid to a gas, including an expansion orifice to trap out droplets of liquid refrigerant,
   means constituting an oil strainer and separator for filtering out droplets of oil and sludge,
   means constituting a desiccant dryer for removing entrained moisture and chlorides,
   an after filter,
   a compressor for recompressing the purified refrigerant gas, including a condenser for liquefying the refrigerant vapors, and
   means for connecting the liquefied refrigerant under pressure in a storage container.

2. The apparatus of claim 1 wherein said compressor comprises a two stage reciprocating dry wall pump.

3. The apparatus of claim 2 wherein said pump includes unloading means, means for actuating said unloading means when the pressure in the discharge side of said pump exceeds a predetermined level, and means for actuating said unloading means when the pressure in the upstream side of said pump falls below a predetermined level.

4. The apparatus of claim 3 including inlet and outlet valves actuated substantially simultaneously with said means for actuating said unloading means.

5. The apparatus of claim 1 wherein said means for heating comprises an uninsulated coiled thermally conductive tube exposed to atmosphere.

6. The apparatus of claim 1 wherein said condenser comprises a finned tube, including means to blow air about said finned tube.

7. The apparatus of claim 1 wherein said dessicant dryer means comprises a regenerative molecular sieve.

8. The apparatus of claim 1 wherein said means constituting an oil strainer and separator includes an epoxy resin impregnated cellulose fiber filter cartridge.

9. The apparatus of claim 8 wherein said after cooler filter comprises an epoxy resin impregnated fiber filter cartridge.

* * * * *